United States Patent [19]
Muramatsu et al.

[11] Patent Number: 6,050,378
[45] Date of Patent: Apr. 18, 2000

[54] ONE-WAY CLUTCH

[75] Inventors: Kazuhiko Muramatsu; Hirofumi Shirataki, both of Fukuroi, Japan

[73] Assignee: NSK-Warner K.K., Tokyo, Japan

[21] Appl. No.: 09/138,522

[22] Filed: Aug. 24, 1998

[30] Foreign Application Priority Data

Aug. 26, 1997 [JP] Japan ..................................... 9-229233

[51] Int. Cl.⁷ .................................................. F16D 11/06
[52] U.S. Cl. ...................................... 192/41 A; 192/45.1
[58] Field of Search ............................. 192/41 A, 45.1, 192/53.1, 415; 384/276, 296

[56] References Cited

U.S. PATENT DOCUMENTS 5,676,226  10/1997  Lampela et al. ..................... 192/45.1
5,758,755   6/1998  Igari .................................... 192/41 A
5,819,899  10/1998  Iga et al. ............................. 192/45.1
5,842,548  12/1998  Sato et al. .......................... 192/41 A

*Primary Examiner*—Charles A. Marmor
*Assistant Examiner*—Tisha D. Waddell
*Attorney, Agent, or Firm*—Vorys, Sater, Seymour and Pease LLP

[57] ABSTRACT

This invention is a one-way clutch directed to decrease the number of parts and the number of working steps and achieve a reduction in cost by changing the material and shape of a holder for the sprags of a conventional art one-way clutch, and is characterized in that the holder is made of a flexible material such as resin and by the utilization of the flexure thereof, the holder is fitted and fixed to an outer race.

31 Claims, 3 Drawing Sheets

ONE-WAY CLUTCH

BACKGROUND OF THE INVENTION

1. Field of the Invention

This invention relates to a one-way clutch used as a part for the transmission of torque, the prevention of reverse rotation, etc. such as in the driving apparatus, of an automobile, an aircraft, an industrial machine or the like. More particularly, it relates to a sprag type one-way clutch of which the number of parts and the number of manufacturing steps are reduced by an improvement in a holding method for a one-way clutch mechanism.

2. Related Background Art

In driving apparatuses, a one-way clutch interposed between an inner race and an outer race for transmitting the torque of rotation in only one direction is well known.

An assembly (or a sub-assembly excluding the outer race and the inner race) comprising the cage of the one-way clutch, a block bearing, a sprag and a quarter spring has heretofore been held by a method shown, for example, in FIG. 5 or FIG. 6 of the accompanying drawings.

The holding method according to the conventional art will hereinafter be described with reference to FIGS. 5 and 6 which are fragmentary axial cross-sectional views of a one-way clutch.

A holder 125 is of a cylindrical shape and has windows (openings) not shown, provided at equal intervals in the circumferential direction thereof and extending therethrough in radial directions, and one of the end portions of the cylinder is provided with a flange portion outwardly bent substantially at a right angle. A sprag 110 functioning as a cam for transmitting the rotational movement in one direction is fitted in at least one window, not shown, in this holder 125. At the same time, a groove is formed in the surface of the sprag 110 that contacts with an outer race 140 and an annular garter spring 170 is fitted thereinto. This garter spring 170 holds the sprags 110 on the holder 125 so that they move integrally, and it also exerts a bias necessary for meshing engagement so as to function as a clutch.

The sprags 110 are fitted into the windows of the holder 125, and an assembly comprising the sprags 110 annularly connected together by the garter spring 170 is fitted between an inner race 130 and an outer race 140.

Also, a retainer 120 is disposed on the outer race 140 so as to bear against the bent portion of the holder so that this assembly may not come apart in the axial direction thereof. Also, as shown in FIG. 6, as means for preventing the assembly from coming apart in the axial direction thereof, instead of the retainer, a snap ring 180 may be embedded in the outer race 140 so that the surface of the ring and the surface of the bent portion of the holder 125 may mutually contact with each other.

Further, in some cases, the retainer 120 bears against a thrust sliding bearing 150, whereby the positioning of the one-way clutch is completed. When the load in the thrust direction is not so great, it has often been practiced to use a spacer 160 of resin or the like also as a thrust sliding bearing. In such case, the spacer 160 of resin or the like has, for example, its resin washer lifted in and fixed to a hole formed in any partner part 150 which is a thrust sliding bearing.

In the fixing method for the conventional sprag type one-way clutch, the number of parts has become great and necessarily the number of manufacturing steps has also become great. Accordingly, the manufacturing cost has increased.

SUMMARY OF THE INVENTION

The present invention has as principal object to provide a sprag type one-way clutch which can achieve a reduction in cost by improving upon the conventional fixing method for the one-way clutch thereby reducing the number of parts and the number of manufacturing steps, and which may have the following construction as means for solving the problem peculiar to the conventional art.

A sprag type one-way clutch in accordance with the invention may comprise an outer race having an inner peripheral raceway surface, an inner race disposed in the user race and having an annular outer peripheral raceway surface, the outer race and the inner race being radially spaced apart from each other and disposed concentrically with each other for rotation relative to each other, a plurality of sprags disposed between the outer race and the inner race for transmitting torque between the outer peripheral raceway surface and the inner peripheral raceway surface, an annular holder for holding the sprags, a spring member sandwiching the sprags between itself and the holder and biasing the sprags in a meshing direction, and a block bearing disposed so as to be adjacent to the sprags between the outer race and the inner race for holding the spring member in the circumferential direction thereof and keeping the inner race and the outer race concentric with each other. The holder is formed of resin or the like which is a flexible material, and the holder is fixed preferably to the outer race by the flexure of the resin or the like. Thereby, the reduction of the number of parts and the number of manufacturing steps is achieved.

Also, the axial fixing of the sprag type one-way clutch has heretofore been conventionally effected by a retainer (a side plate) or a snap ring, but in the preferred practice of the present invention, a holder made of resin is used as the holder for the sprags, and has portions that embrace a portion of a race by the utilization of the flexure of resin to thereby effect the axial fixing of the sprag type one-way clutch.

Also, heretofore, an axial thrust pad has been formed by forming a hole in the casing of an outside part, and fitting a washer made of resin thereinto. In the present invention, however, the holder itself is made of resin, whereby it serves also as a thrust pad.

According to the above-described sprag type one-way clutch according to the present invention, there are obtained the following effects.

The holder made of resin can be fixed to the race, whereby the retainer, the snap ring, etc. can be eliminated and the number of parts can be decreased, and a reduction in the costs of parts and a great reduction in the number of manufacturing steps and the number of working steps can be achieved. Also, the holder made of resin can be formed by injection molding, whereby an improvement in the accuracy of the holder becomes easy.

Further, since the holder is made of resin, the holder itself can function as a thrust sliding bearing, and it becomes unnecessary to provide a thrust sliding bearing on the partner part side as in the conventional art.

Thus, the number of parts is reduced, and as compared with the conventional art, a great reduction in the cost of the product can be achieved.

DETAILED DESCRIPTION OF THE PREFERRED EMBODIMENTS

The present invention will hereinafter be described in detail with reference to FIGS. 1, 2, 3 and 4.

Figure 1:
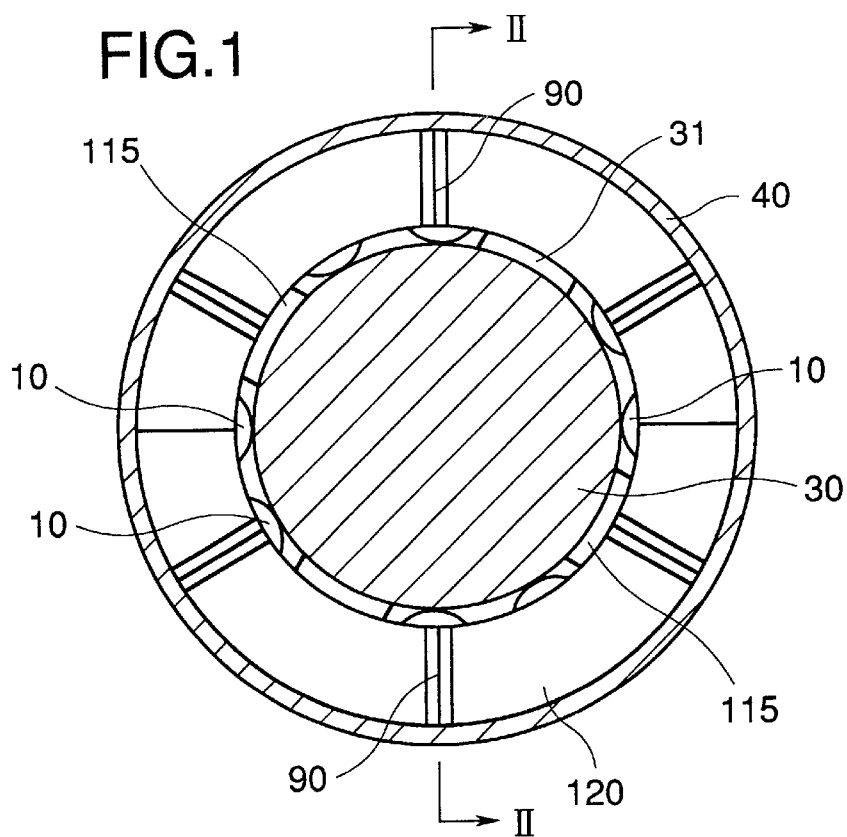
FIG. 1 is a front view of an example of the one-way clutch of the present invention.
Figure 2:
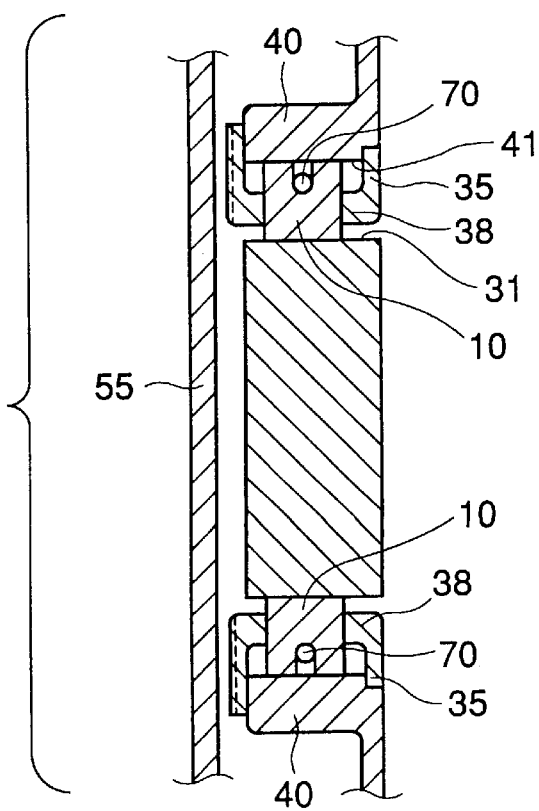
FIG. 2 is a cross-sectional view of the example FIG. 1.
Figure 3:
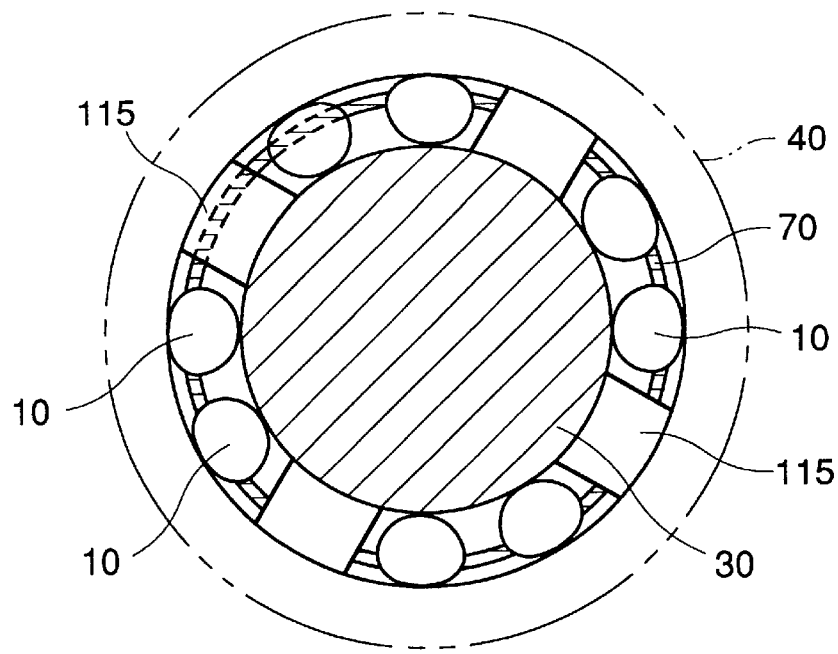
FIG. 3 is a rear view of the one-way clutch represented by FIG. 1, but shown with the holder portion omitted.
Figure 4:
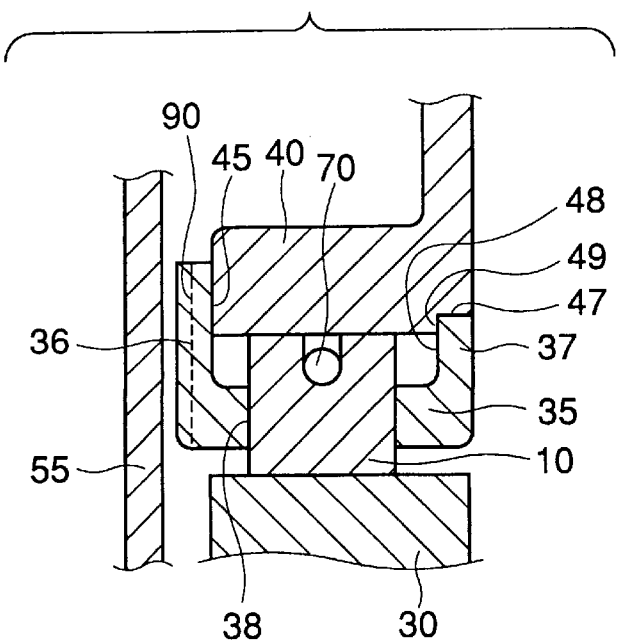
FIG. 4 is an axial cross-sectional view showing the one-way clutch of the present invention.

The overall structure of a sprag type one-way clutch using a holder 35 used in the present invention will be described with reference to FIGS. 1, 2 and 3, and the holder 35 improved over the conventional art improved holder will be described with reference to FIG. 4. In FIGS. 1, 2, 3 and 4, like parts are given like reference numerals. FIG. 2 is a cross-sectional view taken along the line II—II of FIG. 1, and FIG. 3 is a view of the structure of FIG. 1 as it is seen from the back side thereof (however, in FIG. 3, the holder 35 FIG. 2 is not shown in order to show the other members more clearly).

The sprag type one-way clutch of the present invention, as shown in FIGS. 1, 2 and 3, comprises an outer race 40 and an inner race 30 radially spaced apart from each other and disposed concentrically with each other for rotation relative to each other, the outer race 40 having an inner peripheral raceway surface, 41 the inner race 30 being disposed in the outer race 40 and having an annular outer peripheral raceway surface 31. A plurality of sprags 10 is disposed between the outer race 40 and the inner race 30 for transmitting torque between the outer peripheral raceway surface 31 and the inner peripheral raceway surface 41. The clutch further includes an annular holder 35 holding the sprags 10, a spring member, i.e., a garter spring 70 sandwiching the sprags 10 between itself and the holder 35 and biasing the sprags in a meshing direction, and block bearings 115 disposed so as to be adjacent to the sprags between the outer race and the inner race for holding the spring member in the circumferential direction thereof and keeping the inner race and the outer race concentric with each other. The outer race 40 is mounted, for example, onto a friction engagement device, not shown, used in an automatic transmission or the like.

In the present embodiment, the sprags 10 are disposed at eight locations at circumferential intervals.

The sprags 10 are fitted in the windows of the holder 35, and the garter spring 70 is fitted in the grooves of the sprags 10. This garter spring 70 is also fitted in the so-called block bearings 115 having grooves similar to those of the sprags in the circumferential direction thereof (the portion representing the garter spring 70 by dotted lines in the upper left portion of FIG. 3 indicates this fitted state). These block bearings 115 are disposed at four locations circumferentially between successive pairs of sprags, and circumferentially hold the garter spring 70 and keep the outer race 40 and the inner race 30 concentric with each other.

Also V-grooves 90 are provided circumferentially equidistantly at six locations on a thrust pad surface 120 and perform the function of a flow path for lubricating oil supplied to a clutch mechanism or the like.

The numbers of the sprags 10, the block bearings 115 and the V-grooves 90 are not limited to the above-mentioned numbers, which are merely exemplary.

FIG. 2 is a cross-sectional view in which the one-way clutch is axially cut along the line II—II in FIG. 1.

As shown in FIG. 2, there is a case where a partner part (thrust bearing) 55 functioning also as the thrust bearing of the one-way clutch is disposed in the apparatus In this case, the partner part 55 and the holder 35 are not always in contact with each other, but bear against each other or do not bear against each other while rotating, due to the axial backlash thereof. No power is transmitted between the one-way clutch and the partner part. The lubricating oil flowing through the aforementioned V-grooves 90 also serves to cool the members and avoid excessive temperature due to frictional heat created when the partner part 55 and the one-way clutch fictionally contact with each other.

The mechanism of the one-way clutch of the present invention will now be described with reference to FIG. 4 with importance attached to the improved holder 35 used in the present invention. FIG. 4 is a fragmentary enlarged view of the one-way clutch of FIG. 2.

A flexible material such as resin is used as the material of the holder 35. This material may preferably be a material having a lubricating property because the holder 35 serves also as a thrust bearing. If it has a flexible nature, it may be a composite material of resin and other substance.

The holder 35 comprises a cylindrical portion 38, a first flange portion 36 and a second flange portion 37 extending substantially perpendicularly from respective axial end portions of the cylindrical portion 38 so as to be in an opposed relationship with each other in the axial direction of the cylindrical portion 38, and a window portion (an opening), not shown, in which the sprags 10 are fitted and which is formed through the outer peripheral surface to the inner peripheral surface of the cylindrical portion 38 so that the sprags may become pivotally movable. In the present embodiment, the radial size of the first flange portion is set to a value greater than the radial size of the second flange portion. However, in other embodiments, the sizes of the two flange portions may be converse to the foregoing or equal to each other.

The outer race 40 to which this holder 35 is fitted is provided with a stepped portion 47 formed radially and outwardly along the circumference thereof on an end surface opposed to an end surface 45 of the outer race adjacent to the flange portion 36.

Figure 5:
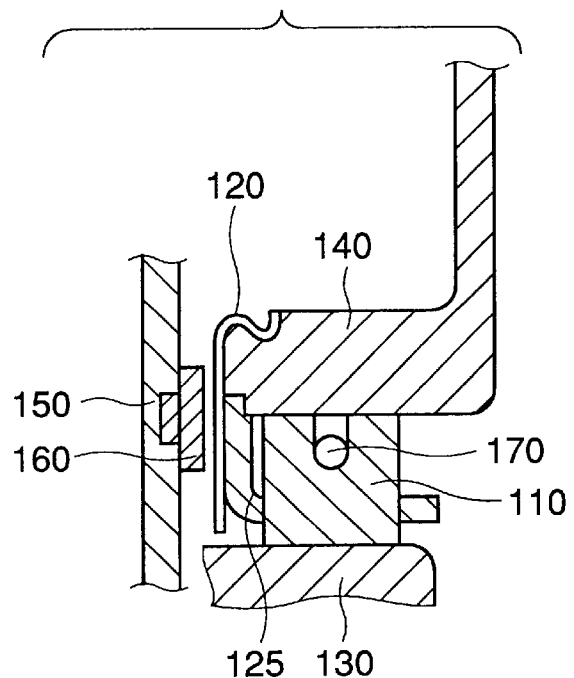
FIG. 5 is an axial cross-sectional view showing a one-way clutch using a conventional fixing method.
Figure 6:
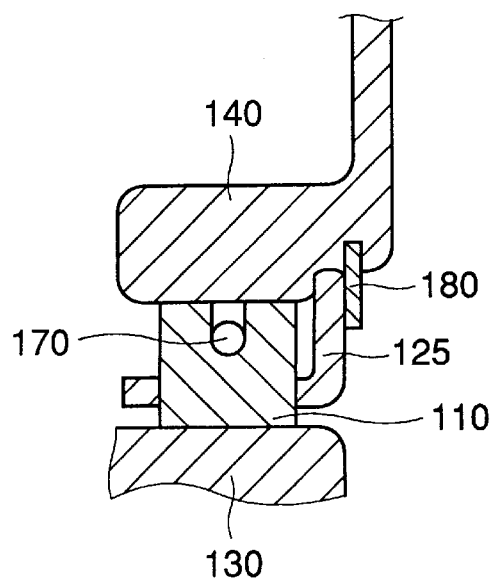
FIG. 6 is an axial cross-sectional view showing another one-way clutch using a conventional fixing method.

The second flange portion 37 is fitted to the stepped portion 47 and the first flange portion 36 is fixed so as to be in close contact with the end surface 45. In the form shown, the outer diameter of the second flange portion 37 is set to be slightly greater than the inner diameter of the stepped portion 47 of the outer race. By the flexure of the first and second flange portions 36 and 37 made of resin, the holder 35 is axially and radially fixed to the outer race 40 by itself without the use of additional parts such as the retainer 120 (FIG. 5) and the snap ring 180 (FIG. 6). That is, the first flange has its movement regulated in the rightward axial direction as viewed in FIG. 4 by the end surface 45, and the second flange has its movement regulated in the leftward axial direction by the end surface 49, and the holder 35 is fixed.

Also, the material of the holder 35 is resin and therefore, the thrust bearing 150 (FIG. 5) made of resin which has heretofore been provided in the partner part can be eliminated and the holder 35 itself plays the role thereof.

The holder 35 made of resin comprising the cylindrical portion 38, the first and second flange portions 36 and 37 and the window portion is prepared by injection molding or the like. Injection molding can make a product of higher dimensional accuracy. The holder 35 may be of an integral type or partly discrete, depending on the manner, ease, etc. of assembling.

It will of course be appreciated that, the holding method for this improved one-way clutch can be applied not only to the embodiment of the one-way clutch represented in FIGS. 1, 2, 3 and 4, but also to one-way clutches of other types.

What is claimed is:

1. A one-way clutch comprising an outer race having an annular inner peripheral raceway surface, an inner race disposed in said outer race and having an annular outer peripheral raceway surface, said outer race and said inner race being radially spaced apart from each other and disposed concentrically with each other for rotation relative to each other, a plurality of sprags disposed between said outer race and said inner race to transmit torque between said outer peripheral raceway surface and said inner peripheral raceway surface, an annular holder holding said sprags, and a spring member sandwiching said sprags between itself and said holder and biasing said sprags in a meshing direction, characterized in that said holder is formed of a flexible material and has axially spaced portions that embrace a portion of one of said races so as to axially fix said holder to said one of said races.

2. A one-way clutch according to claim 1, characterized in that said flexible material contains resin.

3. A one-way clutch according to claim 1, characterized in that said holder comprises a cylindrical portion, an annular first flange portion provided on one axial end portion of said cylindrical portion and extending radially outwardly thereof, and an annular second flange portion provided on another axial end portion of said cylindrical portion and extending radially and outwardly thereof, said first and second flange portions constituting said portions that embrace said portion of said one race, said one race being said outer race.

4. A one-way clutch according to claim 2, characterized in that said holder comprises a cylindrical portion, an annular first flange portion provided on one axial end portion of said cylindrical portion and extending radially outwardly thereof, and an annular second flange portion provided on another axial end portion of said cylindrical portion and extending radially and outwardly thereof, said first and second flange portions constituting said portions that embrace said portion of said one race, said one race being said outer race.

5. A one-way clutch according to claim 3, characterized in that said outer race is provided with a stepped portion formed adjacent to an end of the inner peripheral raceway surface of said outer race and extending radially outwardly along a circumference of said outer race, one of said first and second flange portions being fitted to said stepped portion.

6. A one-way clutch according to claim 4, characterized in that said outer race is provided with a stepped portion formed adjacent to an end of the inner peripheral raceway surface of said outer race and extending radially outwardly along a circumference of said outer race, one of said first and second flange portions being fitted to said stepped portion.

7. A one-way clutch according to claim 1, characterized in that said portions of said holder flexurally embrace said portion of said one race.

8. A one-way clutch according to claim 1, characterized in that said holder comprises a cylindrical portion, an annular first flange portion provided on one axial end portion of said cylindrical portion, and an annular second flange portion provided on another axial end portion of said cylindrical portion, said first and second flange portions constituting said portions that embrace said portion of said one race.

9. A one-way clutch according to claim 8, characterized in that one of said first and second flange portions engages an axial end surface of said one race and provides a thrust bearing surface for contacting a member axially adjacent to said clutch.

10. A one-way clutch according to claim 9, characterized in that said flexible material contains resin.

11. A one-way clutch according to claim 9, characterized in that said thrust bearing surface has lubricating oil grooves formed therein.

12. A one-way clutch according to claim 9, characterized in that said one race is said outer race.

13. A one-way clutch according to claim 8, characterized in that said first and second flange portions flexurally embrace said portion of said one race.

14. A one-way clutch comprising an outer race having an annular inner peripheral raceway surface, an inner race disposed in said outer race and having an annular outer peripheral raceway surface, said outer race and said inner race being radially spaced apart from each other and disposed concentrically with each other for rotation relative to each other, a plurality of sprags disposed between said outer race and said inner race to transmit torque between said outer peripheral raceway surface and said inner peripheral raceway surface, an annular holder holding said sprags, and a spring member sandwiching said sprags between itself and said holder and biasing said sprags in a meshing direction, characterized in that said holder is formed of a flexible material and has portions that flexurally embrace a portion of one of said races such that said holder is axially fixed and self-secured to said one race.

15. A one-way clutch according to claim 14, characterized in that said flexible material contains resin.

16. A one-way clutch according to claim 14, characterized in that said holder comprises a cylindrical portion, an annular first flange portion provided on one axial end portion of said cylindrical portion and extending radially outwardly thereof, and an annular second flange portion provided on another axial end portion of said cylindrical portion and extending radially and outwardly thereof, said first and second flange portions constituting said portions that flexurally embrace said portion of said one race, said one race being said outer race.

17. A one-way clutch according to claim 15, characterized in that said holder comprises a cylindrical portion, an annular first flange portion provided on one axial end portion of said cylindrical portion and extending radially outwardly thereof, and an annular second flange portion provided on another axial end portion of said cylindrical portion and extending radially and outwardly thereof, said first and second flange portions constituting said portions that flexurally embrace said portion of said one race, said one race being said outer race.

18. A one-way clutch according to claim 16, characterized in that said outer race is provided with a stepped portion formed adjacent to an end of the inner peripheral raceway surface of said outer race and extending radially outwardly along a circumference of said outer race, one of said first and second flange portions being fitted to said stepped portion.

19. A one-way clutch according to claim 17, characterized in that said outer race is provided with a stepped portion formed adjacent to an end of the inner peripheral raceway surface of said outer race and extending radially outwardly along a circumference of said outer race, one of said first and second flange portions being fitted to said stepped portion.

20. A one-way clutch according to claim 14, characterized in that said holder comprises a cylindrical portion, an annular first flange portion provided on one axial end portion of said cylindrical portion, and an annular second flange portion provided on another axial end portion of said cylindrical portion, said first and second flange portions constituting said portions that embrace said portion of said one race.

21. A one-way clutch according to claim 20, characterized in that one of said first and second flange portions engages an axial end surface of said one race and provides a thrust bearing surface for contacting a member axially adjacent to said clutch.

22. A one-way clutch according to claim 21, characterized in that said flexible material contains resin.

23. A one-way clutch according to claim 21, characterized in that said thrust bearing surface has lubricating oil grooves formed therein.

24. A one-way clutch according to claim 21, wherein said one race is said outer race.

25. A one-way clutch comprising an outer race having an annular inner peripheral raceway surface, an inner race disposed in said outer race and having an annular outer peripheral raceway surface, said outer race and said inner race being radially spaced apart from each other and disposed concentrically with each other for rotation relative to each other, a plurality of sprags disposed between said outer race and said inner race to transmit torque between said outer peripheral raceway surface and said inner peripheral raceway surface, an annular holder for holding said sprags, and a spring member sandwiching said sprags between itself and said holder and biasing said sprags in a meshing direction, characterized in that said holder is formed of a flexible material, said holder has a cylindrical portion and an annular first flange portion provided on one end portion of the cylindrical portion and extending radially outwardly, and an end surface of said first flange portion with respect to an axial direction of said holder provides a thrust bearing surface for contacting a member axially adjacent to said clutch.

26. A one-way clutch according to claim 25, characterized in that said holder further comprises an annular second flange portion provided on another end portion of said cylindrical portion and extending radially outwardly, and said first and second flange portions are fitted to the outer race.

27. A one-way clutch according to claim 25, characterized in that said flexible material contains resin.

28. A one-way clutch according to claim 26, characterized in that said flexible material contains resin.

29. A one-way clutch according to claim 25, characterized in that, an end surface of said first flange portion with respect to an axial direction of said holder has a radially extending lubricating oil groove formed thereacross.

30. A one-way clutch according to claim 26, characterized in that, an end surface of said first flange portion with respect to an axial direction of said holder has a radially extending lubricating oil groove formed thereacross.

31. A one-way clutch according to claim 27, characterized in that, an end surface of said first flange portion with respect to an axial direction of said holder has a radially extending lubricating oil groove formed thereacross.

* * * * *